Jan. 15, 1929.
G. H. HOLMES
1,699,191
IDENTIFICATION DEVICE FOR AUTOMOBILES
Filed Jan. 16, 1928
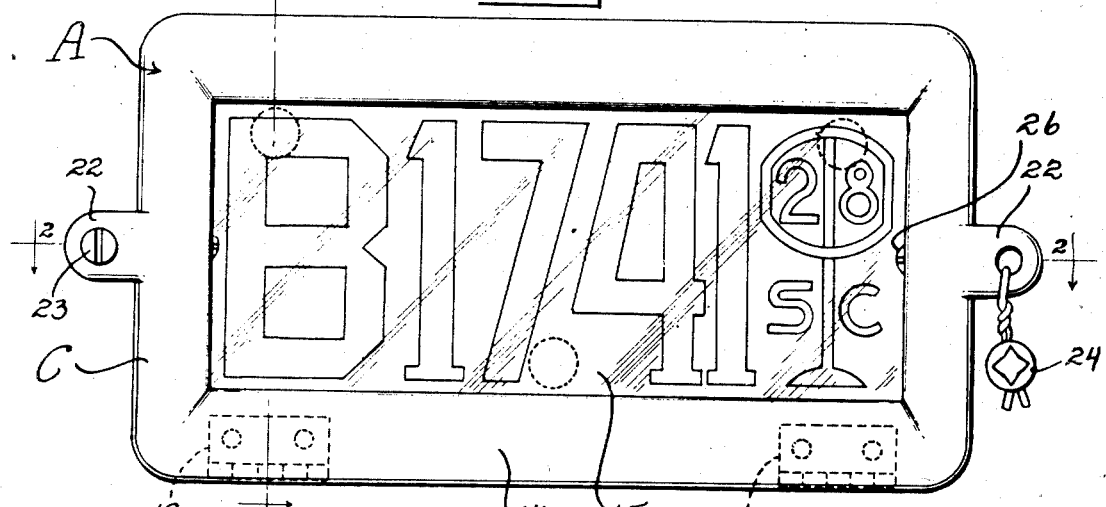
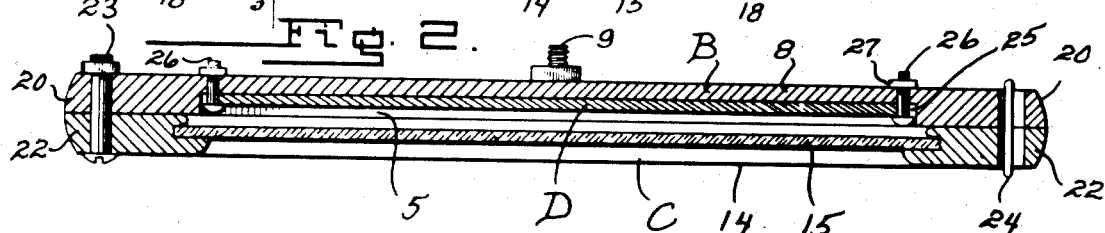
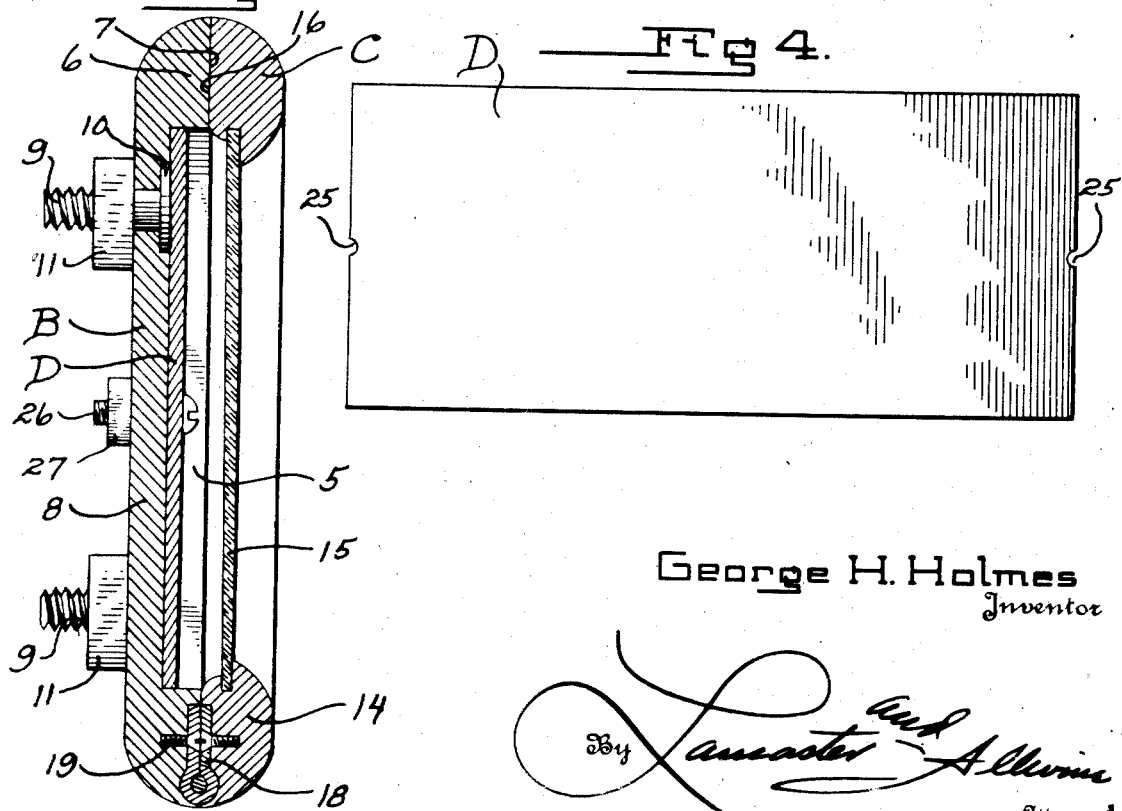
George H. Holmes
Inventor Patented Jan. 15, 1929.

1,699,191

UNITED STATES PATENT OFFICE.

GEORGE H. HOLMES, OF GRANITEVILLE, SOUTH CAROLINA.

IDENTIFICATION DEVICE FOR AUTOMOBILES.

Application filed January 16, 1928. Serial No. 247,201.

The present invention relates to devices for attachment to motor or other forms of vehicles for identification purposes, and the primary object of the invention is to provide a device of this character wherein the identification or license plate is supported in a weather proof casing or holder and thus retained in a clean and protected condition so that the identification characters may be easily read.

A further object of the invention is to provide a device of this character embodying features of construction which will permit of economical manufacture of the identification or license plate, in that the plate may be constructed from relatively thin sheet metal or from sheets of heavy paper or cardboard without liability of the license plate or cards becoming mutilated or disfigured when being displayed as an identification means for motor vehicles.

A further object of the invention is to provide a device of this character embodying a holder for removably receiving the license plate, and which holder is provided with a transparent portion thru which the license plate is visible.

A still further object of the invention is to provide a device of this character which is of strong and durable construction, one which is neat in appearance, and one wherein the license plate may be retained against unauthorized removal.

Other objects and advantages of the invention will be apparent during the course of the following detailed description, taken in connection with the accompanying drawing forming a part of this specification and in which drawing:

Figure 1 is a plan view of the improved identification device.

Figure 2 is a central longitudinal section on line 2—2 of Figure 1.

Figure 3 is an enlarged vertical section on line 3—3 of Figure 1.

Figure 4 is a plan view of the rear side of the license plate or card.

Referring to the drawing in detail, and wherein similar reference characters designate corresponding parts thruout the several views, the improved identification device has been shown as comprising a holder A embodying a pair of pivotally connected complementary sections B and C, and a license plate or card D removably supported in the holder and visible thru a transparency provided in the section C.

The holder A is of rectangular shape in plan and may be constructed of any suitable material.

Referring first to the section B and which may be termed a base plate or back section, the same is of substantially flat construction and is provided in its front face with a rectangular shaped recess 5 forming a forwardly projecting marginal flange 6 having a flat end face 7. This rectangular shaped recess 5 as will be observed in Figures 2 and 3 is of a depth greater than the thickness of the license plate or card D. Extending thru the plate portion 8 of the back section inwardly of the margins of the recess 5, is a suitable number of mounting bolts 9 for attaching the device to suitable supports upon a vehicle. These mounting bolts 9 have flattened heads 10 which are recessed in the plate portion 8 so that the head extends flush with the bottom of the recess 5, and a nut 11 may be threaded upon each bolt for mounting of the holder.

Referring now to the section C and which may be termed the cover section, the same includes an open rectangular shaped frame 14 provided with a transparent panel 15 which is preferably tho not essentially formed of glass. The panel 15 may be secured in any preferred manner within the open frame 14, and as will be observed, the opening formed by the frame 14 is of a dimension slightly less than that of the recess 5. The frame 14 is provided with a flat rear face 16 which is adapted to abut in surface contact, the flat end face 7 of the marginal flange 6.

The back and cover sections B and C respectively are intended to be hingedly connected at their lower edges as by means of flap hinges 18, and these hinges are disposed wholly inwardly of the marginal edges of the holder as clearly shown in Figure 3 so that the fastening screws 19 are fully concealed and thus cannot be removed for allowing unauthorized separation of the cover sections.

Extending from each end of the back section B, and preferably at a location midway the height of the section, are apertured ears or projections 20 which are intended to align with similarly formed ears or projections 22 provided at each end of the cover section B when the sections B and C are disposed in confronting relation. A locking bolt 23 may be passed thru the aligning apertures of the ears at one end of the holder to serve as means for retaining the pivotally connected sections in their holder forming positions. A suitable seal as at 24 may be passed thru the aligning apertures of the ears at the opposite end of the holder, and which seal as will be observed will prevent opening of the holder sections without detection. The seal 24 may constitute a state or any other type of seal. If so desired, the shackle of a padlock may be passed thru the aligning aperture in place of the wire seal 24 so as to prevent unauthorized opening of the holder.

The license plate or card D is in the form of a perfectly flat rectangular shaped sheet of a dimension to snugly fit within the recess 5. This plate or card may either be formed from a relatively thin sheet of metal or of cardboard so that the plate is flexible and has delineated on one face thereof suitable identification data such as illustrated by example in Figure 1. Each end of the license plate or card is provided with a semi-circular shaped notch 25, and which notches are preferably provided at a location midway the height of the plate. Extending thru the plate portion 8 of the back section B at points closely adjacent each end of the recess 5, are headed retaining bolts 26 provided with nuts 27. These retaining bolts 26 are used to more securely fasten the license plate or card in place within the recess 5, and are adapted to have their shank portions extend thru the notches 25 with the heads of the bolts engaging the face side of the plate. In placing the license plate in position within the recess 5 the plate may be flexed transversely and then sprung into place within the recess with the notches 25 accommodating the shank portions of the retaining bolts. After the license plate has been so secured in the recess 5 the cover section C may be swung to a position over the face side of the back section B and then secured to the back section as by the locking bolt 23 and the seal 24. When the sections B and C are in a closed position the license plate or card D will be enclosed in a weather proof casing and in a position within the holder to be readily observed thru the transparent panel 15.

From the foregoing description it will be apparent that a novel and improved identification device for automobiles has been provided embodying a novel arrangement whereby the license plate is mounted in a holder of novel construction providing a weather proof casing for the license plate and yet allowing for the identification data upon the plate to be readily observed thru the transparent portion of the holder. It will also be observed that an arrangement has been provided wherein the license plate may be economically manufactured from any preferred character of sheet material.

Changes in detail may be made to the specific form of invention herein shown and described without departing from the spirit of the invention or the scope of the following claims.

I claim:

1. An identification device of the class described comprising a back section having a recess provided in its front side, a cover section hingedly connected at one edge to one edge of the back section and provided with an opening for aligning with the recess, said opening being of a dimension slightly less than the dimension of said recess, a license plate removably fitting in the recess of the back section with its marginal edges engaging the side walls of the recess and having a notch provided in each end edge thereof, headed retaining bolts extending thru the back section at each end of the recess, said notches of the license plate to receive the shank portions of the retaining bolts with the heads of the bolts overlying the face of the plate at the ends thereof, and means for locking the sections in a closed position.

2. A holder for license plates comprising a back section having a rectangular shaped recess provided in its front side and apertured ears projecting from each end of the section, said recess providing a pocket for removably receiving a license plate, a cover section including an open frame hingedly connected at its lower edge to the lower edge of the back section and having apertured ears projecting from each end of the same for aligning with the apertured ears of the back section, a transparent panel supported inwardly of the open frame to extend over the recess in the back section, retaining means carried by the back section for retaining a license plate in position within the recess, and locking means adapted to extend thru the aligning apertures of said ears for retaining the sections in a closed position to prevent removal of the license plate.

GEORGE H. HOLMES.